(12) United States Patent
Dobson et al.

(10) Patent No.: US 8,263,033 B2
(45) Date of Patent: Sep. 11, 2012

(54) PALLADIUM-CONTANING OXIDATION CATALYST

(75) Inventors: Douglas Allen Dobson, Ypsilanti, MI (US); Robert Henry Hammerle, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/710,531

(22) Filed: Feb. 23, 2010

(65) Prior Publication Data

US 2011/0206584 A1    Aug. 25, 2011

(51) Int. Cl.
 *B01J 23/00* (2006.01)
 *B01J 21/00* (2006.01)
 *B01J 20/00* (2006.01)
 *B01J 29/00* (2006.01)
 *B01D 50/00* (2006.01)
 *B01D 53/34* (2006.01)

(52) U.S. Cl. ........... 423/213.5; 502/60; 502/74; 502/87; 502/333; 502/334; 502/339; 422/177; 422/180

(58) Field of Classification Search ............ 502/60, 502/74, 87, 333, 334, 339; 422/177, 180; 423/213.5
See application file for complete search history.

(56) References Cited

U.S. PATENT DOCUMENTS

| | | | | |
|---|---|---|---|---|
| 4,863,707 A | * | 9/1989 | McShea et al. | 423/359 |
| 4,927,857 A | * | 5/1990 | McShea et al. | 518/703 |
| 5,023,276 A | * | 6/1991 | Yarrington et al. | 518/703 |
| 5,538,697 A | * | 7/1996 | Abe et al. | 422/171 |
| 6,153,160 A | | 11/2000 | Voss et al. | |
| 6,248,684 B1 | | 6/2001 | Yavuz et al. | |
| 7,186,386 B1 | * | 3/2007 | Hiramatsu et al. | 422/171 |
| 7,229,597 B2 | * | 6/2007 | Patchett et al. | 422/177 |
| 7,534,738 B2 | * | 5/2009 | Fujdala et al. | 502/74 |
| 7,576,031 B2 | * | 8/2009 | Beutel et al. | 502/339 |
| 7,709,414 B2 | * | 5/2010 | Fujdala et al. | 502/326 |
| 7,745,367 B2 | * | 6/2010 | Fujdala et al. | 502/60 |
| 7,842,643 B2 | * | 11/2010 | Yabuzaki et al. | 502/303 |
| 7,875,573 B2 | * | 1/2011 | Beutel et al. | 502/339 |
| 8,006,485 B2 | * | 8/2011 | Twigg et al. | 60/295 |
| 2003/0124037 A1 | * | 7/2003 | Voss et al. | 422/177 |
| 2009/0137386 A1 | * | 5/2009 | Pfeifer et al. | 502/262 |
| 2010/0062930 A1 | * | 3/2010 | Sato et al. | 502/339 |

(Continued)

FOREIGN PATENT DOCUMENTS

WO    9310886 A1    6/1993

(Continued)

OTHER PUBLICATIONS

SAE Technical Paper Series, 950259, The Use of Palladium in Advanced Catalysts, R. J. Brisley, G.R. Chandler, H.R. Jones, P.J. Anderson, and P.J. Shady, International Congress and Exposition, Detroit, MI, Feb. 27-Mar. 2, 1995.

*Primary Examiner* — Cam N. Nguyen
(74) *Attorney, Agent, or Firm* — Damian Porcari; Brooks Kushman P.C.

(57) ABSTRACT

According to one aspect of the present invention, a palladium-containing oxidation catalyst is provided. In one embodiment, the palladium-containing oxidation catalyst includes a first zone having a first PGM catalyst loading with a platinum (Pt) to palladium (Pd) weight ratio of no greater than 10.0; and a second zone disposed next to the first zone. In another embodiment, the second PGM catalyst loading has a palladium (Pd) to platinum (Pt) weight ratio of no greater than 4.0.

10 Claims, 9 Drawing Sheets

U.S. PATENT DOCUMENTS

2010/0092358 A1* 4/2010 Koegel et al. .............. 423/213.5
2010/0221154 A1* 9/2010 Lee et al. ...................... 422/177

FOREIGN PATENT DOCUMENTS

| | | | |
|---|---|---|---|
| WO | 0029726 | A1 | 5/2000 |
| WO | 0196717 | A1 | 12/2001 |
| WO | 2006020647 | A1 | 2/2006 |
| WO | 2006056811 | A1 | 6/2006 |

* cited by examiner

PALLADIUM-CONTANING OXIDATION CATALYST

BACKGROUND

1. Technical Field

The present invention relates to oxidation catalyst, and particularly to diesel oxidation catalyst containing palladium as a cost effective partial or total substitution for platinum.

2. Background Art

Emission legislation has imposed increasingly stringent regulations on exhaust waste material emission controls. These waste materials include hydrocarbon (HC), carbon monoxide (CO), nitrogen oxide ($NO_x$) and particulate matter (PM).

Oxidation catalysts, and diesel oxidation catalysts (DOCs) in particular, have been used in exhaust emission control system for delivering one or more of the following functions: 1) remove HC and CO from the exhaust gas as soon as possible after a cold-start; 2) maintain operation through a wide temperature range depending on the diesel application; 3) oxidize excess fuel for an active regeneration process to remove trapped PM; and 4) oxidize nitrogen monoxide (NO) to form nitrogen dioxide ($NO_2$).

Conventional oxidation catalysts use platinum as the key precious metal-based catalytic material. However, the conventional oxidation catalysts have been met with limited use partly due to platinum's increasing unavailability and its high cost. There is a continuing need for oxidation catalysts that are more cost effective while delivering relatively comparable or better performance in reducing waste materials from the exhaust stream.

SUMMARY

According to one aspect of the present invention, a palladium-containing oxidation catalyst is provided. In one embodiment, the palladium-containing oxidation catalyst includes a first zone having a first PGM catalyst loading with a Pt:Pd weight ratio of no greater than 10.0; and a second zone disposed next to the first zone and having a second PGM catalyst loading.

In another embodiment, the second PGM catalyst loading having a Pd to Pt weight ratio of no greater than 4.0.

In yet another embodiment wherein the Pd-containing oxidation catalyst is disposed downstream of a combustion engine, the first zone is downstream of the combustion engine and upstream of the second zone.

In yet another embodiment wherein the Pd-containing oxidation catalyst is disposed within an emission exhaust, at least ninety percent of the total outer surface of the second zone is in contact with the first zone and directed away from the emission exhaust.

In yet another embodiment, the Pt:Pd weight ratio in the first zone is 1.5 to 2.5.

In yet another embodiment, the first zone is essentially free of platinum such that platinum, if present, is of no greater than 10 ppm of the first PGM catalyst loading.

In yet another embodiment, a volume ratio of the first zone relative to the second zone is 10:1 to 1:10.

In yet another embodiment, at least one of the first and the second zones contains a zeolite.

According to another aspect of the present invention, an emission control system is provided for removing waste materials from the exhaust of a combustion engine. The emission control system includes a Pd-containing oxidation catalyst according to one or more embodiments as described herein.

According to yet another embodiment of the present invention, a method is provided for removing waste materials in the exhaust of a combustion engine. The method includes the use of a Pd-containing oxidation catalyst according to one or more embodiments as described herein.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

An oxidation catalyst is typically employed in an emission control system to remove waste materials in the exhaust of a combustion engine. The oxidation catalyst typically performs one or more of the following functions: oxidizing hydrocarbon (HC) and carbon monoxide (CO) to less harmful carbon dioxide, oxidizing nitrogen monoxide (NO) to nitrogen dioxide ($NO_2$) to generate $NO_x$ having a more stoichiometric $NO/NO_2$ ratio, such as that being closer to 1:1, and maintaining light-off activities to keep HCs from slipping off to a downstream SCR catalyst.

It has been surprisingly found that a cost effective precious metal, such as palladium, can be employed to replace at least a portion of the platinum in the oxidation catalyst in performing one or more of the above-described functions. The practice of at least partially replacing platinum with palladium provides further beneficial effect in that the resulting oxidation catalyst is more resistant to high operating temperatures, since palladium is more heat stable than platinum. For instance, platinum can migrate and thus lose catalytic activities upon sintering at temperatures 900° C. or greater. Palladium, however, does not migrate, even at 1100° C. Therefore, the oxidation catalyst as described with more details herein below can be provided with broader temperature windows compared to conventional catalysts.

Figure 1A:
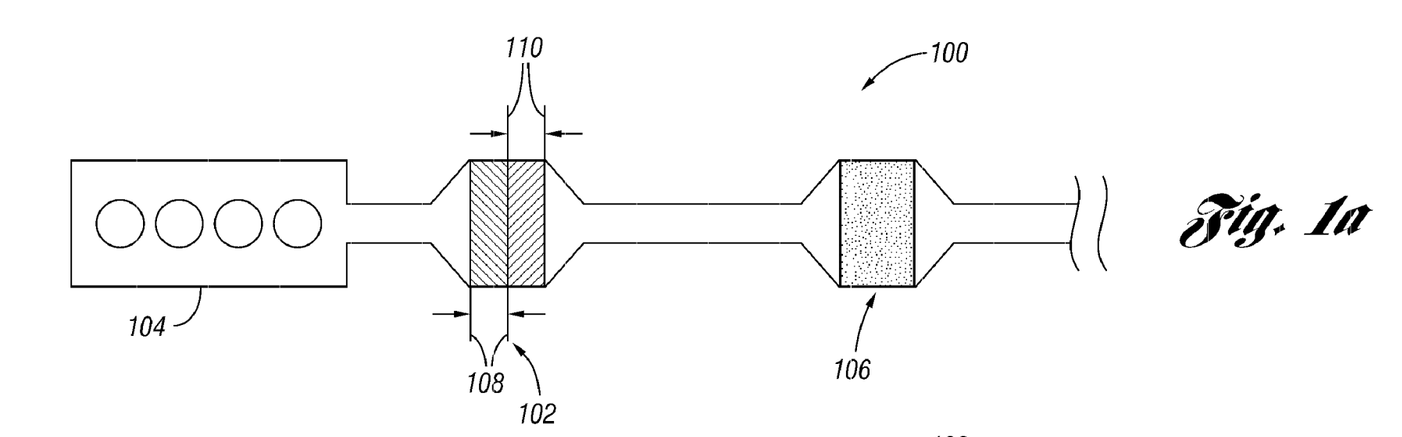
FIG. 1A depicts an emission control system according to one aspect of the present invention.
Figure 1B:
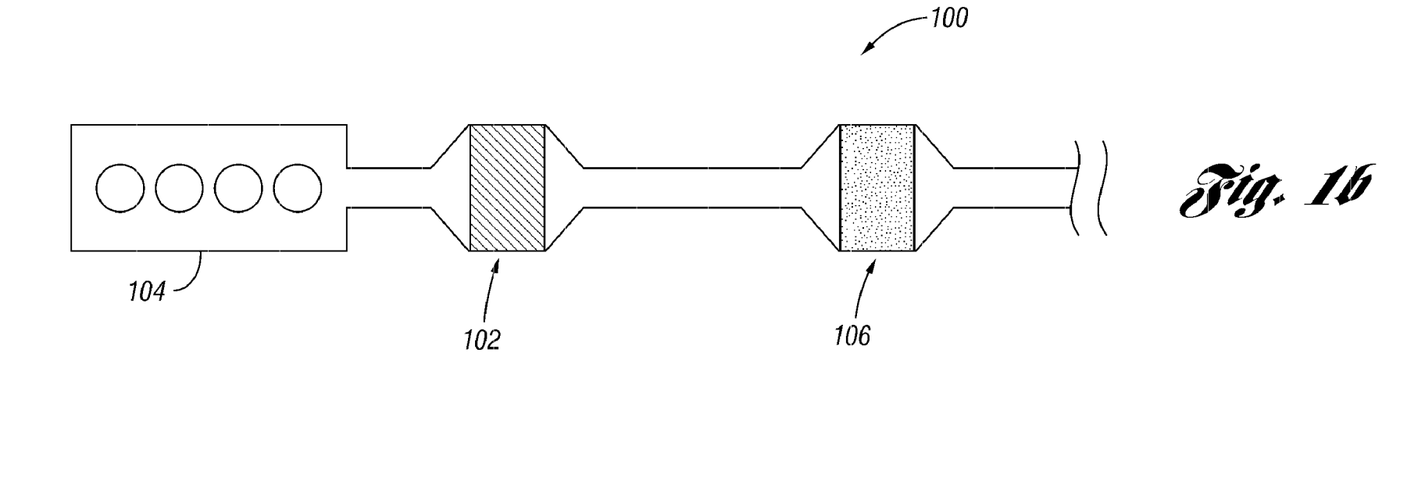
FIG. 1B depicts an emission control system according to another aspect of the present invention.

According to one aspect of the present invention, an emission control system generally shown at 100 is provided. In one embodiment, and as depicted in FIGS. 1A-1B, the emission control system 100 includes a palladium-containing oxidation catalyst 102 disposed downstream of a combustion engine 104 and optionally a selective catalytic reduction (SCR) catalyst 106 disposed downstream of the Pd-containing oxidation catalyst 102. The Pd-containing oxidation catalyst 102 includes a first zone 108 having a first platinum group metal (PGM) catalyst loading with a platinum (Pt) to palladium (Pd) weight ratio of no greater than 10.0, 8.0, 6.0, or 4.0; and a second zone 110 disposed next to the first zone 108.

In another embodiment, the Pt:Pd weight ratio in the first zone is 1.5 to 2.5.

As shown in the FIG. 1A or 1B, the first zone 108 is disposed downstream of the engine 104 and upstream of the second zone 110. In another embodiment, the first and the second zones 108, 110 can be arranged in a core-shell type of configuration (not shown) such that at least ninety percent (90%) of the total outer surface of the second zone 110 is in contact with the first zone 108 and directed away from the exhaust coming out of the engine 104.

In another embodiment, the second PGM loading has a palladium (Pd) to platinum (Pt) weight ratio of no greater than 4.0, 3.0, 2.0, or 1.0.

In yet another embodiment, the Pt to Pd weight ratio in the first zone 108 can be a function of the first PGM catalyst loading such that the Pt to Pd weight ratio decreases as the first PGM catalyst loading increases. The Pt to Pd weight ratio in the first zone 108 can be no less than 1:50, 1:20, 1:18, 1:16, 1:14, or 1:12, and be no greater than 4:1, 3:1, 2:1, 1:1, 1:1.2, 1:1.4, 1:1.6, or 1:1.8. In certain instances, the Pt to Pd weight ratio in the first zone 108 is 1.5 to 2.5.

In yet another embodiment, the first PGM catalyst loading in the first zone 108 can be no less than 45 g/ft³, 70 g/ft³, 80 g/ft³, 90 g/ft³, 100 g/ft³, or 120 g/ft³, and no greater than 210 g/ft³, 175 g/ft³, 155 g/ft³, 135 g/ft³, or 115 g/ft³. In certain instances, the first PGM catalyst loading in the first zone 108 is 70 to 125 g/ft³, 125 to 175 g/ft³. In certain other instances, the first PGM catalyst loading in the first zone 108 is 45 to 120 g/ft³, such as for stable driving conditions, or 120 to 210 g/ft³ for high efficiency or cold start performance.

In yet another embodiment, the Pd to Pt weight ratio in the second zone 110 is a function of the second PGM catalyst loading such that the Pd to Pt weight ratio increases as the second PGM catalyst loading increases. The second PGM catalyst loading also refers to the total PGM loading in the second zone 110. The Pd to Pt weight ratio in the second zone 110 can be no less than 1:50, 1:20, 1:18, 1:16, 1:14, or 1:12, and no greater than 1:4, 1:3, 1:1.8, 1:1.6, 1:1.4, 1:1.2, or 1:1, all inclusive. In certain instances, the Pd:Pt weight ratio in the second zone 110 is 1:50 to 4:1, 1:20 to 1:1, 1:5 to 1:20, 1:9 to 1:11, or 1:2.2 to 1:1.8.

The second PGM catalyst loading in the second zone 110 can be no less than no less than 45 g/ft³, 70 g/ft³, 80 g/ft³, 90 g/ft³, 100 g/ft³, or 120 g/ft³, and no greater than 210 g/ft³, 175 g/ft³, 155 g/ft³, 135 g/ft³, or 115 g/ft³. In certain instances, the second PGM catalyst loading in the second zone 110 is 70 to 125 g/ft³, 125 to 175 g/ft³. In certain other instances, the second PGM catalyst loading in the second zone 110 is 45 to 120 g/ft³, such as for stable driving conditions, or 120 to 210 g/ft³ for high efficiency or cold start performance.

A volume ratio of the first zone 108 relative to the second zone 110 can be 10:1 to 1:10, 8:1 to 1:8, or 5:1 to 1:5. In certain instances, the volume ratio is determined according to the coating capacity of a particular design.

In yet another embodiment, the Pt to Pd weight ratio along with the first PGM catalyst loading and the Pd to Pt weight ratio along with the second PGM catalyst loading are such that the oxidation catalyst 102 achieves at least one of the following performances: 80 percent hydrocarbon (HC) conversion at 250 degrees Celsius or less, 80 percent more carbon monoxide (CO) conversion at 200 degrees Celsius or less, fuel quench threshold at 250 degrees Celsius or less, and 50% nitric oxide (NO) oxidation at 350 degrees Celsius or less.

It has been surprisingly discovered that, according to one or more embodiments of the present invention, palladium can be used to at least replace the platinum otherwise required for a given catalytic task while the resultant catalyst being capable of achieving at least one of the following performances: 80 percent hydrocarbon (HC) conversion at 250 degrees Celsius or less, 80 percent carbon monoxide (CO) conversion at 200 degrees Celsius or less, fuel quench threshold at 250 degrees Celsius or less, and 50% nitric oxide (NO) oxidation at 350 degrees Celsius or less.

In certain instances, it has been found that there exists a synergy between platinum and palladium for compounding the respective benefits each offers. Without being limited to any particular theory, the synergy is believed to be based on the property of platinum as having premium oxidation activities and the property of palladium as having premium resistance to heat and hence superior stability at high temperature operations. This discovery enables a platinum-palladium catalyst to be used with more economic efficiency and wider temperature window for operation.

When used, platinum (Pt) and palladium (Pd) as present in the first or the second zones 108, 110 can be organized in any one of a number of arrangements. For instance, the Pt and Pd can be included in a single washcoat layer. In this arrangement, both the Pd and Pt can be supported on the same support material. Alternatively, the Pd can be supported on a first support material and the Pt is supported on a second support material. Alternatively, the Pt can be disposed in a zone on an upstream end of the substrate monolith and the Pd can be disposed on a downstream end of the substrate monolith. Further alternatively, the substrate monolith is first in contact with a Pt-rich first coating, and then is coated with a Pd-rich second coating, overlaying the Pt-rich first coating, wherein the Pt percent weight of the total PGM loading in the first coating is greater than the Pt percent weight of the total PGM loading in the second coating, or that the second coating contains Pd but no measurable Pt.

Suitable support materials can be selected from the group consisting of titania, zirconia, silica and mixtures and mixed oxides of any two or more thereof or mixed oxides or composite oxides containing alumina and at least one of titania, zirconia and silica, whereas alumina is a more appropriate support material to provide increased thermal durability for the catalyst formulation at the downstream end of the substrate monolith.

When the Pd and Pt are on the same support material, the Pt and Pd can form an alloy. The close contact between the Pt and Pd within the alloy can potentiate additional benefits to the overall catalyst performance. For instance, the alloy is less metallic than Pt. This can be useful for applications where the catalyst is exposed to high temperature because the Pd-containing alloy is more resistant to sintering than Pt alone materials. Moreover, Pd is a relatively poor NO oxidation catalyst compared with Pt, so the alloy can promote NO oxidation more effectively than Pd alone. Accordingly, the alloy can retain HC and CO oxidation activity better than the sintered Pt.

It has further been found, at certain catalytic loading ranges, the catalytic material of the oxidation catalyst can be entirely formed of palladium optionally plus other less expensive precious metals, but essentially free of the more expensive platinum, while delivering comparable catalytic performance relative to an all-platinum oxidation catalyst. As used herein, the term "essentially free" means that no platinum is purposefully added to the oxidation catalyst, and any platinum present would be incidental. Incidental presence of platinum should be no more than 100 ppm, 50 ppm, or 10 ppm (parts per million). Typically, the overall effect of Pd can be ignored when Pd is present in an amount of no greater than 10 ppm.

Referring back to FIG. 1A, the first zone 108, the second zone 110, or both the zones 108, 110, can be essentially free of platinum, and in certain instances, contain palladium as the only precious metal for oxidation reactions. This feature of the oxidation catalyst 102 according to one or more embodiments of the present invention is particularly beneficial at certain high operating temperatures when platinum would have diminished catalytic activities due to heat-induced migration. A palladium-containing oxidation catalyst that is free of platinum is also useful when $NO_x$ conversion is not critically important, such as when an incoming exhaust having NO and $NO_2$ at stoichiometric ratios.

In yet another embodiment, and as depicted in FIG. 1B, the palladium oxidation catalyst 102 can be provided with one catalyst loading throughout its coating surface (not shown) such that there exists no intentional separation of two or more zones as shown in FIG. 1A. In one extreme scenario, the Pd-containing oxidation catalyst 102 can be provided with palladium but can be essentially free of platinum as defined hereinabove. This configuration is particularly possible when the total catalyst loading is greater than 100 g/ft$^3$, 125 g/ft$^3$, or greater than 150 g/ft$^3$.

When the palladium-containing oxidation catalyst is free of platinum, the oxidation catalyst can be formulated, optionally with one or more binders, such as the binder elements listed in Table 3, to be provided with desirable HC or CO conversion responses.

It has been found that the catalytic material can accommodate the inclusion of zeolite wherein the palladium-containing catalyst material still maintains an acceptable catalytic performance. The zeolite-containing oxidation catalyst, according to one or more embodiments of the present invention, is similarly capable of achieving one or more of the following performances: 80 percent hydrocarbon (HC) conversion at 250 degrees Celsius or less, 80 percent more carbon monoxide (CO) conversion at 200 degrees Celsius or less, fuel quench threshold at 250 degrees Celsius or less, and 50% nitric oxide (NO) oxidation at 350 degrees Celsius or less.

Suitable zeolites as used herein can be beta-zeolite, Y-zeolites, ZSM-5, mordenite, and others with similar acid site density, pore sizes and having a silica-to-alumina ratio of from about 5 to about 250. The zeolites can be used either in the known H-form or in a metal-exchanged form. In certain instances, the concentration of zeolite in the washcoat can be from about 0 wt % to about 50 wt %, and particularly from about 10 wt % to about 30 wt %.

As known in the art, most catalysts employed to treat the exhaust of internal combustion engines are less effective during periods of relatively low temperature operation, such as the initial cold-start period of engine operation. This is because the engine exhaust is not at a temperature sufficiently high for efficient catalytic conversion of waste materials in the exhaust. It has been found, according to one or more embodiments of the present invention, an adsorbent material such as zeolite can be used as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

Further, the zeolite component of the present invention is able to trap hydrocarbon molecules which might otherwise, during periods when the exhaust gas is relatively cool, escape untreated from the catalyst. It is believed that the trapped hydrocarbons are either oxidized within the zeolite or released from the zeolite only when the temperature of the catalyst composition is high enough to effectively catalyze oxidation of the trapped hydrocarbons, or both.

Pores present in the zeolite also serve to retain some of the gas-phase hydrocarbons during start-up or other periods when the catalyst is relatively cool and therefore less effective in catalyzing oxidation reactions, and to release the hydrocarbons only when the catalyst has been heated to higher temperatures. The higher temperatures impart sufficient energy to the trapped hydrocarbon molecules to enable them to escape the zeolite pores, but also enhance oxidation of the hydrocarbons in contact with the catalyst. The zeolite therefore serves not only as a catalyst for VOF oxidation, but as a hydrocarbon filter which traps hydrocarbons during periods of relatively low temperature and concomitant low catalytic activity and retains them until they can be efficiently oxidized by the catalyst during periods of relatively high temperature.

The catalytic material can be supported on a substrate, which can be either ceramic or metallic, as is known in the art. Honeycomb substrates are commonly used in applications for treatment of exhaust because the honeycombs create low back pressure to the exhaust flow. In the present application, suitable honeycomb substrates include those made of cordierite, mullite, silicon carbide, alumina, titania, zirconia, silica, alumina-silica, alumina-zirconia, stainless steel, Fe—Cr—Al alloy and the combinations and other materials typically used for diesel oxidation catalysts.

The catalytic material can then be deposited on the honeycomb substrate. The Pt and Pd contained in the catalytic material can be deposited in the form of a salt solution such as, without limitation, platinum sulfite acid platinum, tetraamine nitrate, palladium nitrate, and rhodium nitrate. Optionally, a sulfur oxidation suppressant can be added to the metal-loaded substrate. The suppressant is selected from the group consisting of vanadium, chromium, bismuth, tin and combinations thereof, and can be deposited in the form of a salt solution. For example, if vanadium is added to the substrate, it can be added as a solution of vanadium pentaoxide, ammonium vanadate, and vanadium oxalate, without limitation. Particularly, the sulfur oxidation suppressant loading on the catalyst is from about 20 g/cf to about 200 g/cf, and preferably from about 40 g/cf to about 100 g/cf.

One or more embodiments of the present invention are further illustrated by the following non-limiting examples.

EXAMPLES

Sample preparations and general test methods relevant to the examples described herein are as follows:

The catalyst monoliths used for preparing the diesel oxidation catalyst (DOC) samples are 1 inch×1 inch cores with a cell density of 400 cpsi (cells per square inch). The DOC samples are prepared according to two evaluation conditions: degreened and 2-mode aged. The degreening process includes one hour of exposure to base lean operating conditions with a controlled temperature ramp to 650° C. For the aging simulation, the DOC samples are rapidly aged with doped fuel having 300 ppm (parts per million) sulfur and 15 mg (milligrams) phosphorus/gal for 100 hours. These poison levels are selected to simulate the full life exposure of a DOC to the sulfur and phosphorus levels equivalent to 120 k mi of in-use operation based on a 10,000 mpq oil consumption rate. The 2-mode aging protocol includes a low temperature poisoning mode ($T_{inlet}$<300° C.) and a lean heating mode for DPF regeneration ($T_{outlet}$>700° C.)

For pulsator degreening processes according to the examples described herein, catalyst samples are degreened or stabilized with an iso-octane clear fuel at 650° C. for one hour. The fuel contains 1800-2100 PPM (parts per million) HC, 0.25% CO, 350-450 PPM NO, 8-10% $O_2$, 5% $H_2O$, and 12% $CO_2$. The fuel contains no $SO_2$ or phosphate. Space velocity for the degreening process is 50,000/hr.

For pulsator two-mode aging processes according to the examples described herein, catalyst samples are aged with an iso-octane fuel at 700° C. for 100 hours. The fuel contains 300 PM S/15 mg P per gallon. For lean operation, the fuel further contains 150-250 PPM HC, 0.15-0.25% CO, 350-450 PPM $NO_x$ and 10% $O_2$. For DPF regeneration, the fuel further contains 1500-1800 PPH HC, 3.0% CO, 150-200 PPM $NO_x$ and 6-8% $O_2$.

Clear fuel (no sulfur or phosphorus) is used during the evaluations, and the space velocity across each DOC core is 50,000 $hr^{-1}$. In the light-off and $NO_2$ formation experiments, the average air-fuel ratio (AFR) is approximately 30:1, a ratio typical for diesel lean operating conditions. The inlet gas temperature of the DOC core is ramped from 100° C. to 650° C. using a 10° C./min ramp rate. The temperatures required for 50% conversion (T50) and 80% conversion (T80) of CO and HC are generated during light-off testing. The peak percentage of $NO_2$ formation rate and temperature, relative to total $NO_x$, is determined.

For the HC/CO lightoff conversion experiments according to the examples described herein, each experiment run is stabilized at temperatures lower than 120° C. to allow for DOCs with HC/CO trapping materials such as zeolite to saturate to measure HC storage, wherein the HC/CO components are entrapped in the zeolite during cold-start temperatures and are released at higher temperatures in which the catalysts become more catalytically active. All relevant data points are average of 2-3 runs.

For the NO oxidation experiments according to the examples described herein, peak $NO_2$ accumulation level and corresponding operating temperature for the peak $NO_2$ formation are valuable parameters to consider as $NO_2$ benefits lean $NO_x$ trap (LNT) and SCR function and promote passive DPF regeneration.

In the Diesel Fuel Quench Threshold Test (FQT), low sulfur diesel fuel is injected (air-assisted) upstream of the DOC samples to generate heat for the DPF regeneration. Injection occurs sufficiently upstream of the DOC to allow for good mixing prior to in-catalyst ignition. The air-assisted mixture is preheated to prevent fuel pooling near the injector. The temperature and HC traces provided the threshold where spontaneous combustion of the fuel is not adequate to sustain the heat generation for DPF regeneration or excess HC slip became an issue.

For the diesel fuel quenching experiments according to the examples described herein, ignition completeness at start of fuel injection and ease of system in maintaining required outlet temperature are monitored. For downstream injection, low sulfur diesel through air-assisted injector is used. HC emissions are monitored to determine excess HC slip during the downstream injection.

Additionally, washcoat adhesion testing is performed on each submission to validate standard catalyst durability. Core samples are exposed to a cyclic thermal shock from room temperature to about 1150° C., at about 120 seconds per cycle. The cycling is performed for 12 h and measurements are taken to determine the amount of washcoat loss. Washcoat loading and uniformity of each sample are verified using XRF (X-ray fluorescence) analysis. All samples are within an acceptable loading limit of +/−5% of the target loading. The surface area of degreened and aged samples is determined through BET (the multipoint Brunauer, Emmett, and Teller method) analysis in order to evaluate the washcoat durability after exposure to direct fuel during the active DPF regeneration mode. The BET method was performed using the Micromeritics ASAP 2400 in conjunction with a custom built set of glassware for enabling the analysis on an intake core up to one inch in diameter and one inch in length. Data from the BET analysis are reported as BET surface areas. The surface area measurements show greater drops for zeolite containing samples compared to the non-zeolite DOCs after the 2-Mode aging and high temperature exposure.

Blanks indicated in the Tables 2 and 3 represent compositions not examined for the relevant example(s) described herein.

Example 1

The first part of the PGM (Platinum Group Metal) loading and ratio study focuses on DOC samples that do not contain zeolite in their respective catalytic washcoat. The total PGM content is varied from 5 to 180 g/ft$^3$, and the Pt to Pd ratio ranges from all Pt (1:0) to all Pd (0:1). Initial testing consists of several samples at varying Pt to Pd ratios based on a moderate PGM loading level of about 70 g/ft$^3$. Testing is repeated for specific formulations with higher PGM loading levels of about 150 g/ft$^3$. Pt and 2:1 Pt to Pd samples are further evaluated at several additional total PGM loading levels to generate performance curves. Compositions of the DOC samples are listed in Table 1. Performance data from these tests results in several comparisons based on total PGM to show that Pd can suitably replace Pt for DOC functional needs.

TABLE 1

Non-zeolite Catalyst Material Sample Matrix

| Pt to Pd ratio | Total PGM Content (g/ft³) | | | | | | | | | | | | |
|---|---|---|---|---|---|---|---|---|---|---|---|---|---|
| 1:0  |     |     | 130 |     |    | 90 | 70 |    |    |    | 20 |    | 5 |
| 20:1 |     |     |     |     |    |    | 70 |    |    |    |    |    |   |
| 10:1 |     |     |     |     |    |    | 70 |    |    |    |    |    |   |
| 5:1  |     |     |     | 105 |    | 90 |    | 65 |    |    |    |    |   |
| 2:1  | 180 | 150 |     | 105 |    |    | 75 |    | 45 |    |    | 10 | 5 |
| 1:1  |     |     |     |     |    |    | 70 |    |    | 40 |    |    |   |
| 1:4  |     |     |     |     |    |    |    |    |    |    |    |    | 50 |
| 0:1  |     | 150 |     |     |    |    |    |    |    |    |    |    |   |

Figure 2:
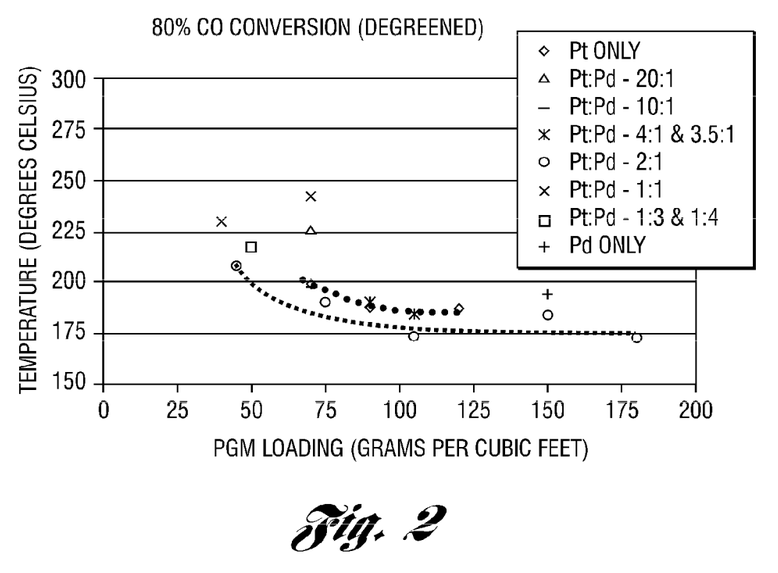
FIGS. 2 and 3 respectively illustrate T80 values for CO lightoff of degreened and pulsator-aged non-zeolite DOC samples as described in the Examples.
Figure 3:
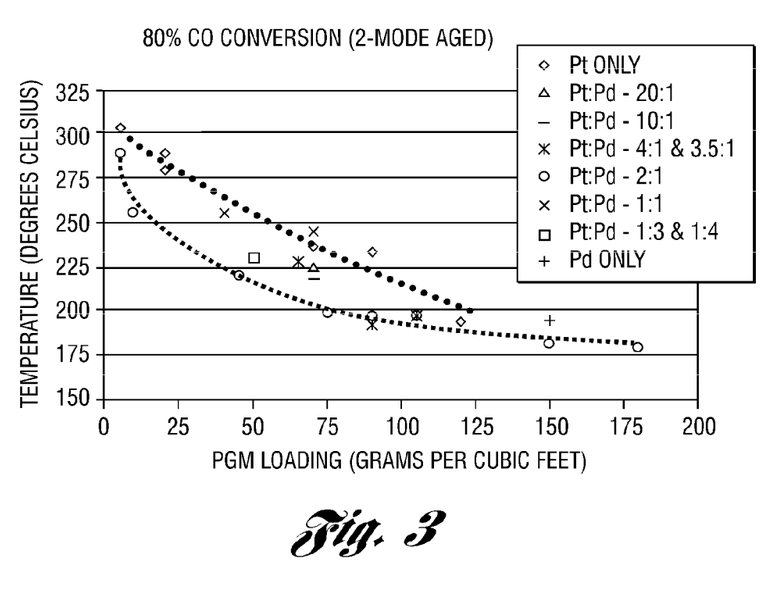

FIGS. 2 and 3 show T80 values for CO lightoff of degreened and pulsator-aged non-zeolite DOC samples. At the moderate loading level of 70 g/ft³, Pt only, 2:1 and 10:1 Pt to Pd samples are capable of achieving 80% conversion at temperatures below 200° C. in the degreened state. After the 2-mode aging, the 2:1 Pt:Pd DOC sample still delivers 80% CO conversion below the 200° C. threshold temperature. At the high loading condition of about 150 g/ft³, Pt only, Pd only and 2:1 Pt to Pd samples all have roughly equivalent performance and show limited deterioration due to aging. For the Pt only and 2:1 Pt to Pd samples, performance curves are presented on the plots to show the effect of PGM loading on performance. The shapes of the curves are similar, but after aging the Pt to Pd samples elicit improved performance and durability. As can be seen, relative to the 10:1 or 20:1 Pt:Pd samples, the 2:1 Pt:Pd samples show comparable or better performance while delivering substantial cost benefits.

Figure 4:
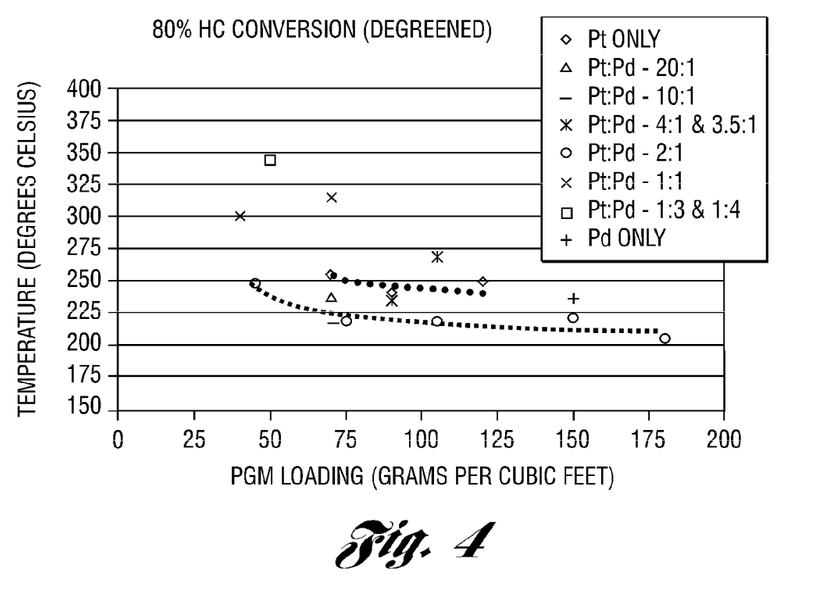
FIGS. 4 and 5 respectively illustrate T80 values for HC light-off of the degreened and pulsator-aged non-zeolite DOC samples as described in the Examples.
Figure 5:
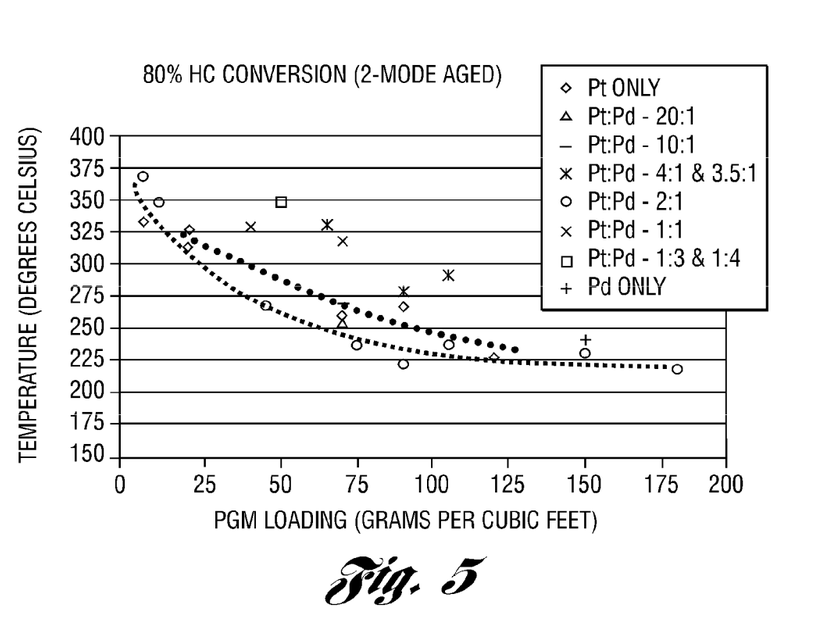

FIGS. 4 and 5 show T80 values for HC light-off of the degreened and pulsator-aged samples non-zeolite DOCs. For the degreened evaluations, at the moderate loading level of about 70 g/ft³, all of the high Pt containing samples are capable of achieving 80% HC conversion at temperatures below 250° C. After the 2-moded aging, the 2:1 Pt:Pd DOC sample still performs 80% HC conversion below the 250° C. temperature threshold. At the high PGM loading level of about 150 g/ft³, Pt only, Pd only and 2:1 Pt:Pd all have roughly equivalent performances and elicit limited deterioration due to rapid aging. For the Pt only and 2:1 Pt:Pd samples, performance curves are presented on the plots to show the effect of PGM loading on performance. The shapes of the curves are similar, but after aging the Pt:Pd samples show better performance and durability.

Figure 6:
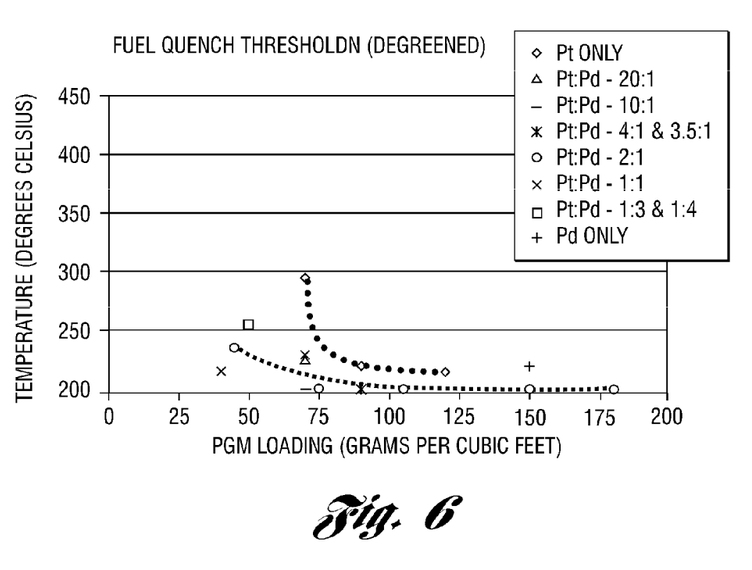
FIGS. 6 and 7 respectively illustrate the fuel quench threshold results for the samples listed in Table 1.
Figure 7:
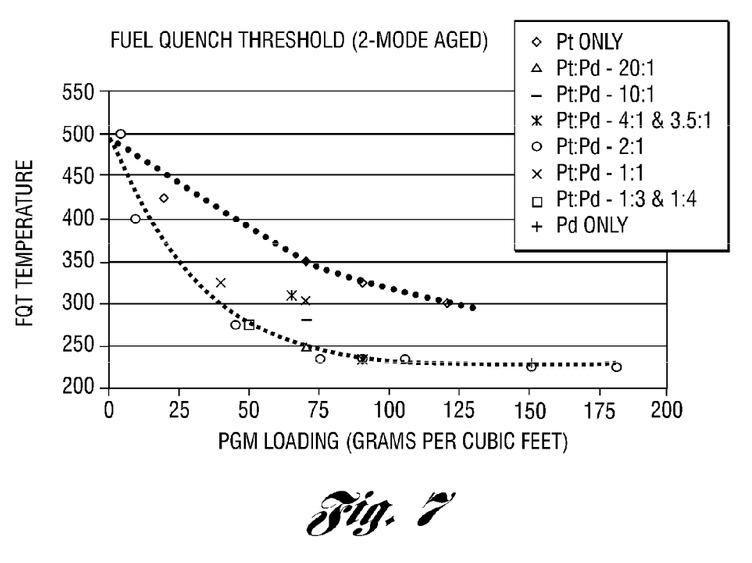

The next performance characteristic is the ability of the DOC samples to achieve active DPF regenerations at manageable operating temperatures. FIGS. 6 and 7 show the fuel quench threshold results for the samples listed in Table 1, degreened or pulsator-aged. To avoid accumulation of excess fuel in the pulsator, the minimum temperature used for the threshold test is 200° C. for the DOC outlet. The degreened samples show that the Pt:Pd systems are capable of achieving spontaneous on-catalyst oxidation of the excess fuel at the minimum temperature of 200° C. for loadings above 75 g/ft³. Pt only and Pd only samples are close only being about 25° C. apart. However, a significant differential in performance can be seen after aging to 100 hrs. Pt only systems have the most deterioration and Pd only systems have almost none. The Pt:Pd mixes tend to trend with the bias of Pt or Pd, again with the 2:1 system showing the best durability beyond Pd-only DOCs. It is beneficial to determine a threshold temperature above which DPF regeneration can consistently be achieved with post or downstream injection of fuel. One such threshold temperature is 250° C. $NO_2$ in the total $NO_x$ is beneficial as both the LNT and the SCR can use the $NO_2$ to improve the overall $NO_x$ conversion; moreover, $NO_2$ also assists passive soot regeneration.

Figure 8:
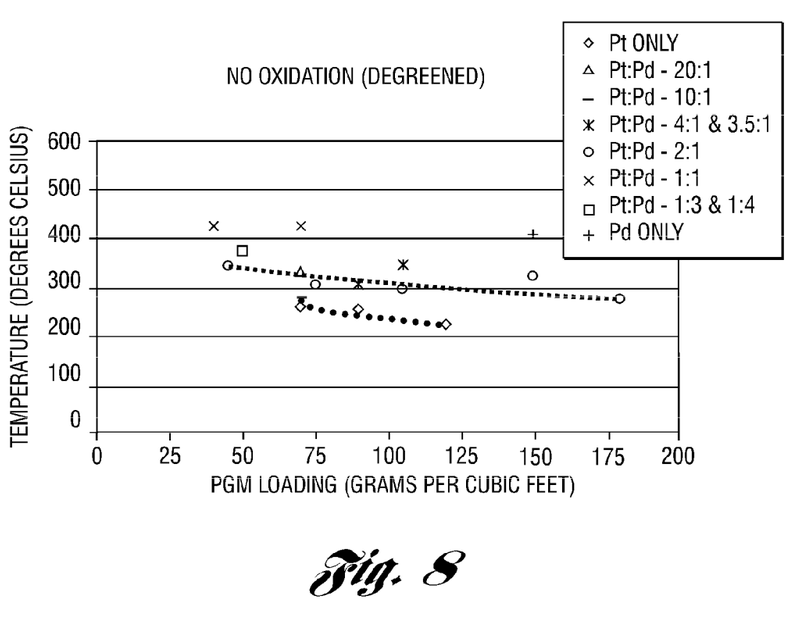
FIGS. 8 and 9 depict percent $NO_2$ formation in the total $NO_x$ as a function of platinum loading for the non-zeolite-containing degreened samples and the non-zeolite-containing aged samples, respectively.
Figure 9:
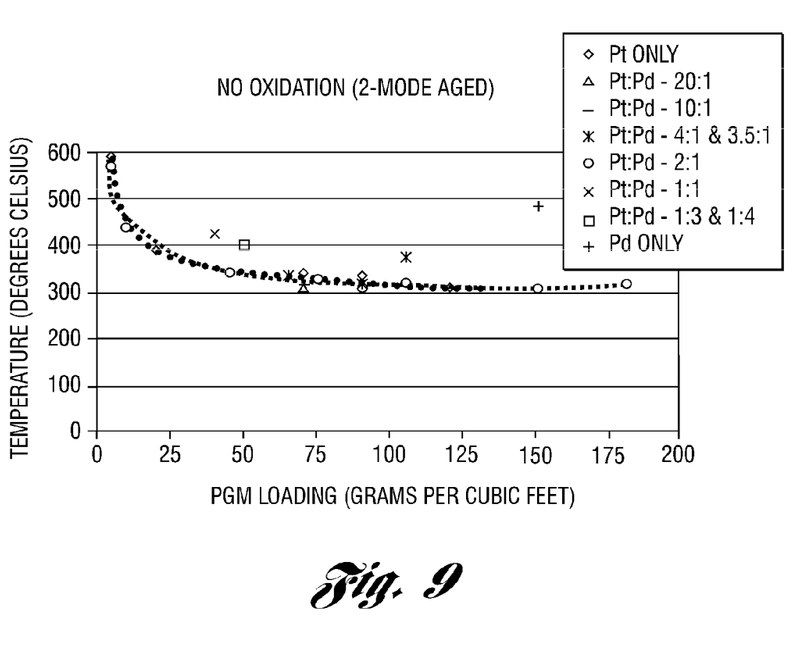

Another characteristic under review is the NO oxidation capability of DOCs to generate $NO_2$ at low operating temperatures. The benefit of $NO_2$ for SCR and LNT function is mainly in the low temperature region between 200-350° C. The peak occurring in the low 200s would provide the greatest benefit for $NO_x$ removal by a downstream SCR or LNT. At higher temperatures, greater than 350° C., the generation of $NO_2$ would benefit passive soot regeneration on DPFs. FIGS. 8 and 9 show the peak $NO_2$ levels and the temperatures at which the peak formation occurs for the degreened and aged DOCs. It is beneficial to plot the peak $NO_2$ formation as a function of the Pt content. With regard to the NO oxidation and hence the resultant $NO_2$ content, these results show that Pt level exerts more impact than the overall PGM content. The degreened samples show peaks at or above 50:50 mix of $NO_2$:NO for loadings above 50 g/ft³. However, only the Pt only samples achieve these peaks at temperatures below 300° C. at moderate PGM loadings. The loss of performance appears to be due to sintering of Pt during the aging process as all samples elicit deterioration and only 2:1 Pt:Pd samples and high Pt only (>120 g/ft³) samples have peak levels remaining above 35% $NO_2$ production. Additionally, none of the peaks were achieved at temperatures below 300° C., but the 2:1 Pt:Pd samples displayed the most durable performance.

FIG. 9D depicts $NO_2$ formation percentages compared among samples loaded with Pt only, Pt:Pd of 2:1, Pt:Pd of 1:1; Pt:Pd of 1:4, Pt:Pd of 1:10, and Pd only. A longer aging period of 120 hrs is employed in the experiment of FIG. 9D, compared to the aging period of 100 hrs as used in the experiment of FIG. 9B. The Pt only, the 1:10 and the Pd only samples have a loading around 150 g/ft³. The S;1 and 1:1 are loaded at 105 g/ft³. In this rerun experiment, the Pt/PD ratios 20:1 and 10:1 are not examined as they still require substantial amount of Pt and therefore these ratios do not necessarily impart the requisite economical efficiency.

Example 2

Evaluations are repeated with DOC samples that contain zeolite with compositions illustrated in Table 2. Zeolite is added to the washcoat for cold-start HC control and to limit excessive HC build-up on downstream components, such as SCR catalysts and DPFs. However, excess amount of HC can plug or even poison the zeolite component in the catalyst at temperatures below about 350° C. In addition, excessive HC stored in the DPF can provide an energy source for increased or runaway temperatures internal to the DPF.

TABLE 2

Zeolite Containing Catalyst Material Sample Matrix

| Pt:Pd ratio | Total PGM Content (g/ft³) | | | | | | |
|---|---|---|---|---|---|---|---|
| 1:0  |     | 150 | 120 |     |    | 70 | 55 |
| 20:1 |     |     |     |     |    | 70 |    |
| 2:1  | 180 |     |     | 105 |    | 75 |    |
| 1:1  |     |     |     |     |    | 70 | 60 |
| 1:4  |     |     |     |     | 80 |    |    |
| 0:1  |     | 150 |     |     |    |    |    |

Figure 10:
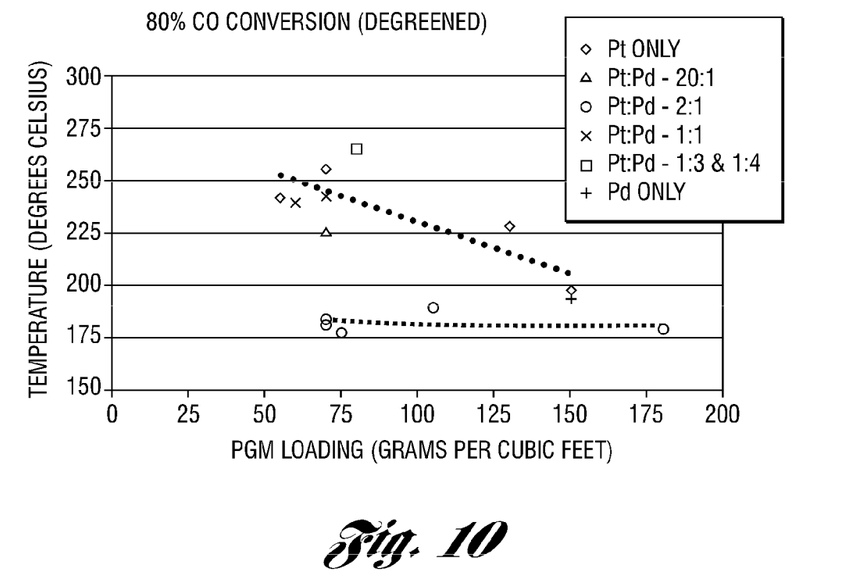
FIGS. 10 and 11 respectively illustrate T80 values for CO lightoff of degreened and pulsator-aged zeolite-containing DOC samples as described in the Examples.
Figure 11:
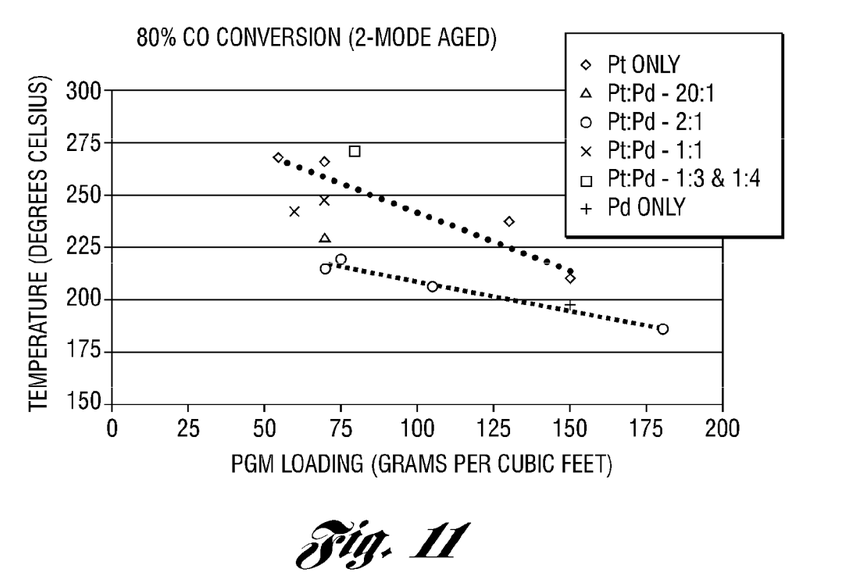

FIGS. 10 and 11 show T80 values for CO lightoff of degreened and pulsator aged zeolite-containing DOC samples. For the degreened evaluations, at the moderate loading level of about 70 g/ft³, the 2:1 Pt:Pd samples are capable of achieving 80% conversion at temperatures below the 200° C. threshold. The Pt only samples need about 25° C. warmer temperatures to achieve 50% CO conversion at equivalent PGM loading levels in comparison to non-zeolite containing DOC samples. The results for the T80 values are similar among the samples having various Pt/Pd weight ratios. The 2:1 Pt:Pd shows similar performance for zeolite and non-zeolite containing washcoats. After aging, the leading performance is from the 2:1 Pt:Pd DOC achieving T80 at about 215° C. At the high PGM loading level of about 150 g/ft³, Pt only, Pd only and 2:1 Pt:Pd all have roughly equivalent performance and show limited deterioration from the rapid aging. However, unlike the non-zeolite samples, the Pt only sample is slightly above 200° C. for 80% conversion. For the Pt only and 2:1 Pt:Pd samples, performance curves are presented on the plots to show the effect of PGM loading on performance. The curves show that the Pt:Pd samples show better performance and durability.

Figure 12:
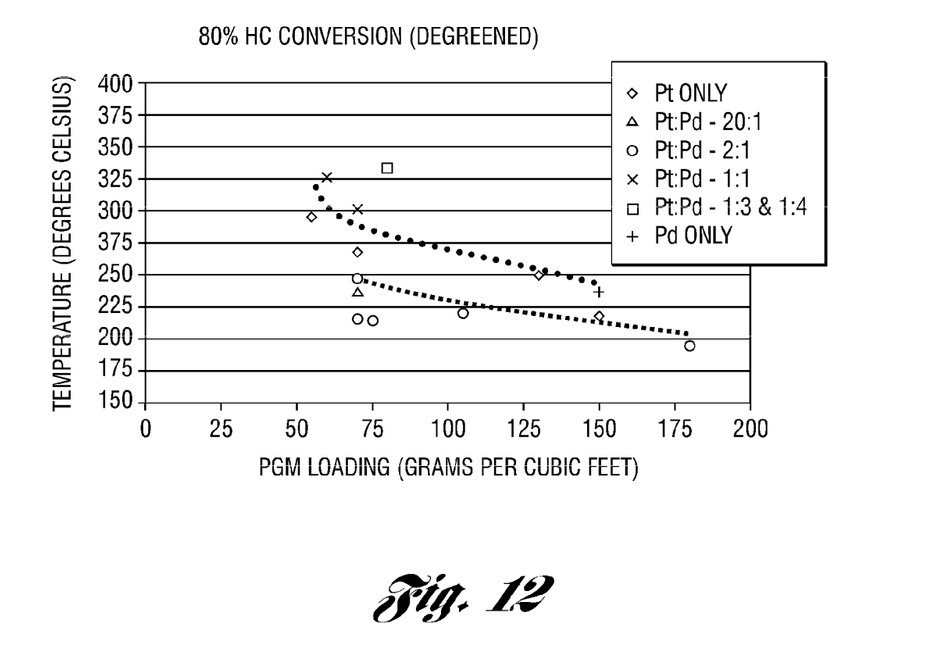
FIGS. 12 and 13 respectively illustrate T80 values for the HC light-off of the degreened and pulsator-aged zeolite-containing DOC samples as described in the Examples.
Figure 13:
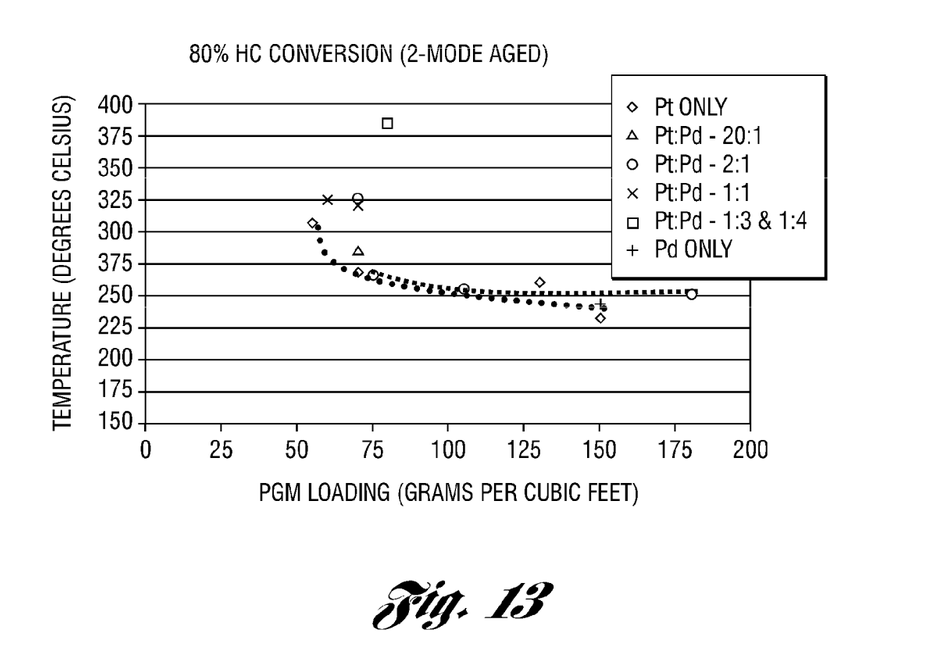

FIGS. 12 and 13 show T80 values for the HC light-off of the degreened and pulsator-aged zeolite containing DOC samples. For the degreened evaluations, at the moderate loading level of about 70 g/ft³, all of the high Pt containing samples are capable of achieving 80% conversion at temperatures below 275° C. This target temperature of 275° C. is used to adjust for the presence of the zeolite in the samples. Again the 25° C. shift in T80 is present for the zeolite containing Pt only DOCs. After aging, the 2:1 Pt:Pd and the Pt only DOC are below 275° C. for 80% conversion. At the high PGM loading level of about 150 g/ft³ total PGM, Pt only, Pd only and 2:1 Pt:Pd samples all have roughly equivalent performances after aging and show limited deterioration due to rapid aging. For the Pt only and 2:1 Pt:Pd samples, performance curves are presented on the plots to show the effect of PGM loading on performance. The shapes of the curves are similar, but after aging the Pt:Pd samples show equivalent or better performance and durability.

These light-off data show that, for both HC and CO, the samples with a Pt:Pd ratio of 2:1 are a performer for light-off performance and durability. The data also show a significant performance loss as PGM content is lowered. This trend details the limits to define DOCs with lower PGM that maintain performance and durability with zeolite for cold-start HC control.

Figure 14:
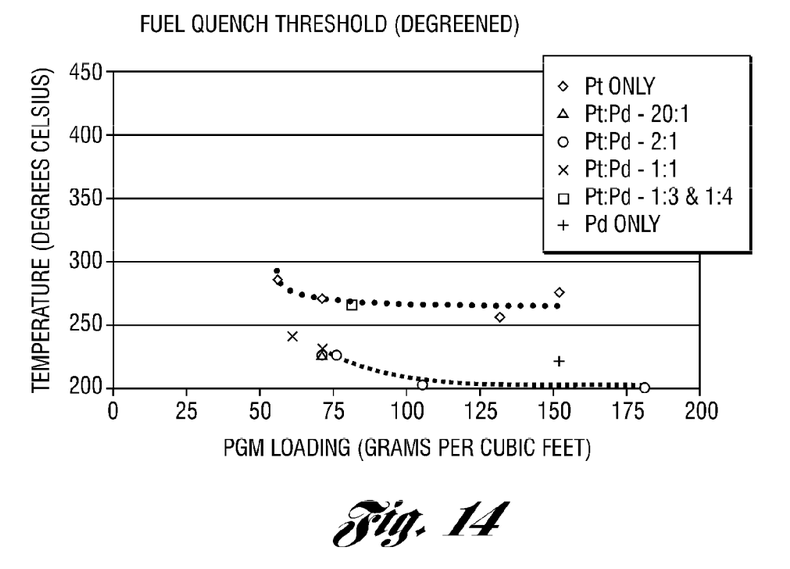
FIGS. 14 and 15 illustrate the fuel quench threshold results for the zeolite-containing samples as described in the Examples.
Figure 15:
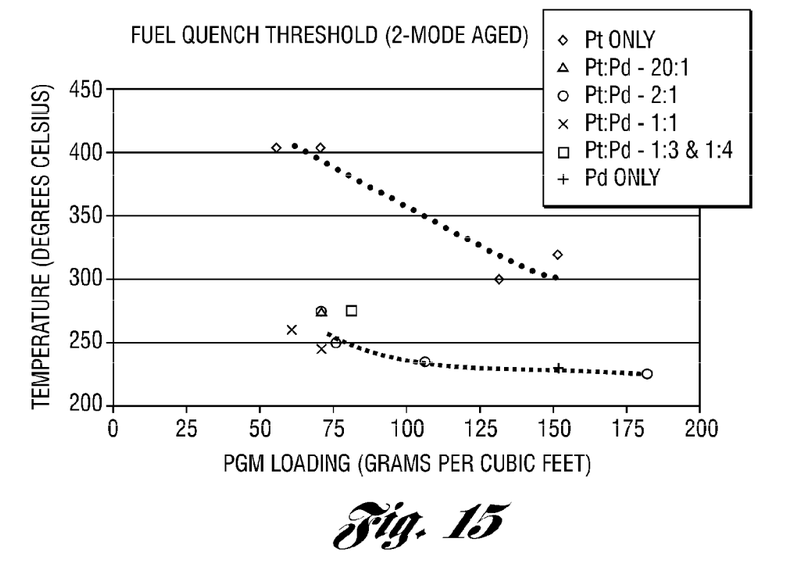

The next performance characteristic is the ability of the zeolite-containing DOC samples to achieve active DPF regenerations at low operating temperatures. FIGS. 14 and 15 show the fuel quench threshold results for the zeolite containing samples used in this study. To avoid accumulation of excess fuel in the pulsator, the minimum temperature used for the threshold test is 200° C. for the DOC outlet. The degreened samples show that the Pt:Pd systems are capable of achieving spontaneous on-catalyst oxidation of the excess fuel at the minimum temperature of 200° C. for loadings above 105 g/ft³. Pt only and Pd only samples are close only being about 50° C. and 25° C. higher, respectively. The significant differential in performance can be seen after aging to 120K mile equivalence. Pt only systems show the most deterioration with the Pd only showing almost none. The Pt:Pd mixes tend to trend with the bias of Pt or Pd, with the 2:1 system showing the best durability beyond Pd only DOCs.

Figure 16:
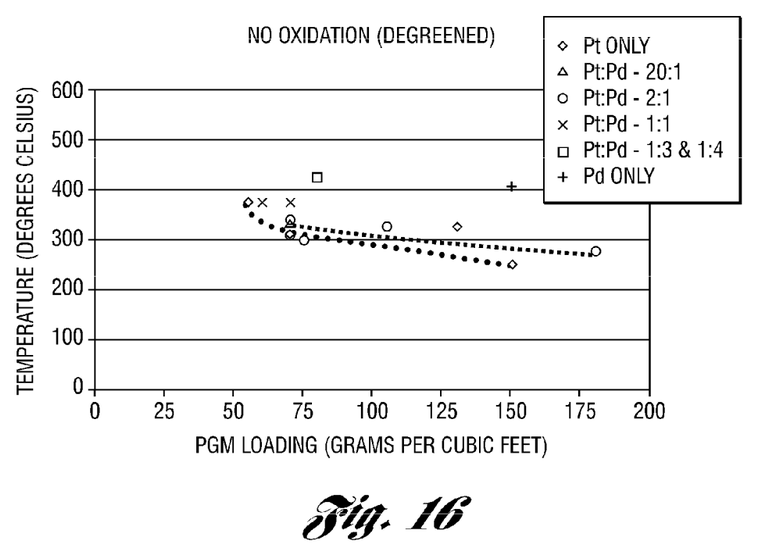
FIGS. 16 and 17 depict percent $NO_2$ formation in the total $NO_x$ as a function of platinum loading for the zeolite-containing degreened samples and the zeolite-containing aged samples, respectively.
Figure 17:
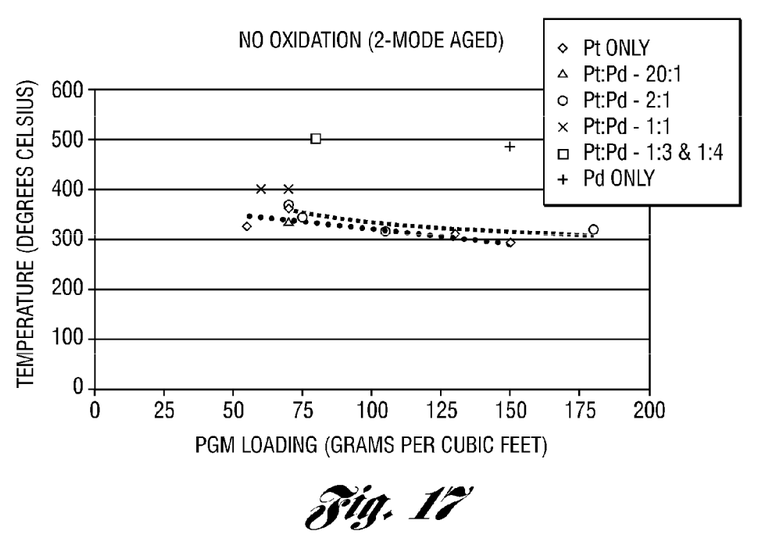

FIGS. 16 and 17 show the peak $NO_2$ levels and the temperatures at which the peak occurred for the degreened and aged DOCs. As detailed earlier, it is beneficial to plot the peak $NO_2$ formation as a function of the Pt content. These results show that the overall PGM content is not as important as the Pt levels if NO oxidation is desired. The degreened samples show peaks at or above 50:50 mix of $NO_2$:NO for loadings above 50 g/ft³. However, the various samples only achieve these peaks at temperatures below 300° C. with high PGM loading. The loss of performance appears to be due to sintering of Pt during the aging process as all samples show deterioration and only 2:1 Pt:Pd (>75 g/ft³) samples and high Pt only (>90 g/ft³) samples have peak levels remaining above 35% $NO_2$ production. Additionally, none of the peaks were achieved at temperatures below 300° C., but the 2:1 Pt:Pd samples show good durability to maintaining performance through the aging process. The zeolite samples show slightly greater deterioration in the NO oxidation but the temperatures were insensitive to the aging process.

Example 3

TABLE 3

XRF Analysis Results of DOC Samples Combined with Elemental Binder(s)

| Element | Sample | |
|---|---|---|
| | Pd Only | Pt:Pd |
| Na | 0.02 | 0.01 |
| Mg | 5.86 | 5.56 |
| Al | 24.8 | 24.6 |
| Si | 19.2 | 15.7 |
| P | 0.011 | 0.006 |
| S | 0.003 | 0.003 |
| Cl | 0.002 | 0.003 |
| K | 0.013 | 0.013 |
| Ca | 0.051 | 0.051 |
| Ti | 0.29 | 0.26 |
| V | 0.006 | 0.006 |
| Cr | 0.00 | 0.005 |
| Mn | 0.00 | 0.002 |
| Fe | 0.24 | 0.23 |
| Co | 0.019 | 0.020 |
| Ni | 0.001 | 0.003 |
| Cu | 0.00 | 0.00 |
| Zn | 0.001 | 0.002 |
| Ga | 0.003 | 0.004 |
| Sr | 0.003 | 0.002 |
| Y | 0.00 | 0.001 |
| Zr | 0.016 | 0.051 |
| Mo | 0.00 | 0.00 |
| Ru | 0.00 | 0.00 |
| Rh | 0.000 | 0.000 |
| Pd | 1.143 | 0.29 |
| Cs | 0.00 | 0.00 |
| Ba | 0.00 | 0.00 |
| La | 0.001 | 0.008 |
| Ce | 0.025 | 0.042 |
| Pr | 0.00 | 0.00 |
| Nd | 0.00 | 0.00 |
| Hf | 0.00 | 0.00 |
| W | 0.13 | 0.10 |
| Pt | 0.00 | 0.274 |
| Pb | 0.00 | 0.00 |

Varying Pt/Pd ratios can be optimized using one or more binders. Table 3 depicts XRF analysis results, representing the weight percent of each element relative to the total weight of the analyzed sample, compared among various binders including No, Mg, Ce and Zr. The binder elements are mixed such that Pd is well dispersed in the washcoat slurry. Upon proper mixing with binder elements such as Ce and Zr, Pd only DOC formulations can be generated to have strong HC/CO oxidation performance. It is found that inclusion of one or more of the binder elements further enhances the catalyst durability of the Pd-only sample catalysts. For this part of the experiment, surface area analysis performed using the Micromeritics ASAP 2400 in conjunction with a custom built set of glassware that is capable of performing the analysis on an intact core up to one inch diameter and one inch in length. Data re reported as BET surface areas.

X-ray fluorescence (XRF) specimens are prepared by first grinding each 1-inch diameter by 1-inch long core sample in a ceramic-lined grinding dish to obtain a fine, homogenous powder. A 6-gram sample of each powder was then mixed with 0.5 grams of Chemplex® X-Ray Mix, packed into an aluminum cap and compacted into a 4.5 mm thick by 31 mm diameter pellet using a hydraulic press. X-ray intensity data were collected using a Panalytical® PW2400 sequential wavelength-dispersive XRF spectrometer with a chromium target X-ray tube. Element concentrations were calculated from the X-ray data using UniQuant® (version 5), a fundamental parameters quantitative analysis program. A specialized calibration based on catalyst reference materials and matrix-matched in-house standards was used to compensate for errors associated with the analysis of multi-phase materials. A customized background model with carefully selected fixed background points was used to improve accuracy and trace element analysis.

For scanning electron microscope (SEM), Particles >~30-40 nm are detectable using backscattered electron (BSE) imaging and energy dispersive x-ray spectroscopy (EDX).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An oxidation catalyst comprising:
   a first zone containing palladium (Pd) and having a first platinum group metal (PGM) catalyst loading with a platinum (Pt) to Pd weight ratio of 1.5 to 2.5; and
   a second zone disposed next to the first zone and having a second PGM catalyst loading less than the first PGM catalyst loading.

2. The oxidation catalyst of claim 1, wherein the second PGM catalyst loading has a Pt to Pd weight ratio of no less than 0.25.

3. The oxidation catalyst of claim 1 to be disposed downstream of a combustion engine, wherein the first zone is downstream of the combustion engine and upstream of the second zone.

4. The oxidation catalyst of claim 1 to be disposed within an emission exhaust, wherein at least 90 percent of the total outer surface of the second zone is in contact with the first zone and directed away from the emission exhaust.

5. The oxidation catalyst of claim 1, wherein a loading ratio between the first and the second PGM catalyst loadings is of 1.5 to 10.0.

6. The oxidation catalyst of claim 1, wherein a volume ratio of the first zone relative to the second zone is 10:1 to 1:10.

7. The oxidation catalyst of claim 1, wherein at least one of the first and the second zones contains zeolite.

8. The oxidation catalyst of claim 1, wherein the first PGM loading and the second PGM loading are each in grams per cubic feet ($g/ft^3$).

9. A method of removing waste materials in the exhaust of a combustion engine, comprising:
   contacting the exhaust with an oxidation catalyst to form a treated exhaust, wherein the oxidation catalyst includes a first zone containing palladium (Pd) and having a first platinum group metal (PGM) catalyst loading with a platinum (Pt) to Pd weight ratio of 1.5 to 2.5, and a second zone disposed next to the first zone and having a second PGM catalyst loading less than the first PGM catalyst loading.

10. The method of claim 9, further comprising contacting the treated exhaust with a selective catalytic reduction (SCR) catalyst.

* * * * *